US012619029B2

(12) United States Patent
Bockstaele et al.

(10) Patent No.: US 12,619,029 B2
(45) Date of Patent: May 5, 2026

(54) DEPOLARIZATION

(71) Applicant: Sentea NV, Ghent (BE)

(72) Inventors: Ronny Bockstaele, Ghent (BE);
Karsten Verhaegen, Ghent (BE); **Thijs
Spuesens**, Ghent (BE)

(73) Assignee: Sentea NV, Ghent (BE)

( * ) Notice: Subject to any disclaimer, the term of this
patent is extended or adjusted under 35
U.S.C. 154(b) by 294 days.

(21) Appl. No.: 18/556,103

(22) PCT Filed: Apr. 29, 2022

(86) PCT No.: PCT/EP2022/061498
§ 371 (c)(1),
(2) Date: Oct. 19, 2023

(87) PCT Pub. No.: WO2022/229394
PCT Pub. Date: Nov. 3, 2022

(65) Prior Publication Data
US 2024/0192443 A1 Jun. 13, 2024

(30) Foreign Application Priority Data
Apr. 30, 2021 (EP) ..................................... 21171490

(51) Int. Cl.
*G02B 6/126* (2006.01)
*G02B 6/35* (2006.01)
(Continued)

(52) U.S. Cl.
CPC ........... *G02B 6/126* (2013.01); *G02B 6/3548*
(2013.01); *G02B 27/1006* (2013.01);
(Continued)

(58) Field of Classification Search
CPC ...................... G02B 6/126; G02B 2006/12116
See application file for complete search history.

(56) References Cited

U.S. PATENT DOCUMENTS 10,591,672 B2 * 3/2020 Van Thourhout .. G02B 6/12004
10,809,460 B2 * 10/2020 Dülk .................... G02B 6/2786
(Continued)

FOREIGN PATENT DOCUMENTS

JP H07248422 A * 9/1995

OTHER PUBLICATIONS

JP_H07248422_A English translation (Year: 1995).*

*Primary Examiner* — Charlie Y Peng
(74) *Attorney, Agent, or Firm* — Ipsilon USA—NLO

(57) ABSTRACT

Provided herein is a depolarizer circuit having an input
waveguide configured to receive light from a light source; a
splitter configured to provide light from the input waveguide
in a first and second polarization states; a first rotator
configured to rotate the light from the first polarization state
to the second polarization state; a first delay line configured
to delay the light in the second polarization state; a coupler
configured to couple the rotated and delayed light; a second
rotator configured to rotate the coupled light back to the first
polarization state; a second delay line configured to delay
the coupled light in the second polarization state; and a
combiner configured to combine light from second rotator
and delay line as depolarized light, where the first and
second delay lines provide a phase delay difference ther-
ebetween greater than or equal to a coherence of the light
source.

15 Claims, 4 Drawing Sheets

(51) Int. Cl.
  *G02B 27/10*          (2006.01)
  *G02B 27/28*          (2006.01)
  *G02B 6/12*           (2006.01)

(52) U.S. Cl.
  CPC .. *G02B 27/283* (2013.01); *G02B 2006/12085* (2013.01); *G02B 2006/12104* (2013.01); *G02B 2006/12116* (2013.01); *G02B 2006/12145* (2013.01); *G02B 2006/12147* (2013.01); *G02B 2006/1215* (2013.01)

(56)              References Cited

U.S. PATENT DOCUMENTS

| | | | |
|---|---|---|---|
| 11,209,679 B2 * | 12/2021 | Schrans | G02F 1/025 |
| 2004/0150876 A1 * | 8/2004 | Dagenais | H04B 10/2914 |
| | | | 359/344 |
| 2004/0165808 A1 | 8/2004 | Lauzon | |
| 2015/0078702 A1 * | 3/2015 | Dorin | G02F 1/2257 |
| | | | 385/11 |
| 2017/0227710 A1 | 8/2017 | Lamponi et al. | |

* cited by examiner

DEPOLARIZATION

FIELD OF THE INVENTION

The present invention relates, in general, to a depolarizer circuit. The present invention further relates to a system composing a depolarizer circuit. The present invention further relates to a use of a depolarizer circuit in an optical interrogator. The present invention further relates to a method for depolarizing light in a depolarizer circuit.

BACKGROUND ART

Depolarizers are optical devices, required to convert polarized light into a pseudo-randomly polarized light, which is then called depolarized or scrambled light. While polarized light can be very useful in many photonic applications, some specific applications require non-polarized light for effective operation and accurate measurement, like Raman spectroscopy, Fourier transform infrared spectroscopy (FTIR) spectrometry, Raman amplifier, optical imaging, and optical fiber rotation sensing.

Several types of depolarizers are well known, such as Cornu depolarizer, Lyot depolarizer, Wedge depolarizer and Time-variable depolarizer. However, such depolarizers are very expensive and have very limited applications. Moreover, existing optical interrogators, e.g. including the aforementioned types of depolarizers, are bulky and, thus, impractical.

Ragheb et al. (2015) have described an integrated slanted angle Lyot depolarizer and an integrated Mach-Zehnder optical depolarizer in "Design of an InGaAsP/InP compact integrated optical depolarizer". However, such depolarizers require an active phase shifter and a feedback control signal for any general elliptically polarized light. Moreover, such depolarizers can entail interference effects.

Therefore, there is a need in the art to provide an improved depolarizer circuit and method for depolarizing light therein.

SUMMARY OF THE INVENTION

It is an object of the present invention to provide an improved depolarizer circuit, which does not show one or more of the above-mentioned disadvantages.

According to the present invention, a depolarizer circuit is provided, comprising an input waveguide configured to receive light from a light source; a splitter connected to the input waveguide and configured to provide, at a first output of the splitter, light in a first polarization state and, at a second output of the splitter, light in a second polarization state; a first rotator connected to the first output of the splitter and configured to rotate light received therefrom from the first polarization state to the second polarization state; a first delay line connected to the second output of the splitter; a coupler comprising a first and second output and configured to couple the light received from the first rotator and the first delay line; a second rotator connected to the first output of the coupler and configured to rotate light received therefrom back to the first polarization state; a second delay line connected to the second output of the coupler; and a combiner connected to the second rotator and the second delay line and configured to combine light received from each thereof as depolarized light, wherein the first and second delay lines provide a phase delay difference there between being greater than or equal to a coherence of the light source.

According to the present invention, a system comprising a reflector and a depolarizer circuit as described above is provided.

According to the present invention, use of a depolarizer circuit as described above in an optical interrogator and/or an optical gyroscope is provided.

According to the present invention, a method of depolarizing light in a depolarizer circuit, preferably the depolarizer circuit as defined above is provided.

Advantageously, the present invention may ensure that interference effects on light from two light paths are minimized. Moreover, the present invention may provide improved incoherent coupling of light, which results in an effective depolarization of the light.

Additional and alternative objects of the present invention may be understood from the following.

BRIEF DESCRIPTION OF THE DRAWINGS

The present invention will be discussed in more detail below, with reference to the attached drawings, in which.

DESCRIPTION OF EMBODIMENTS

Figure 1:
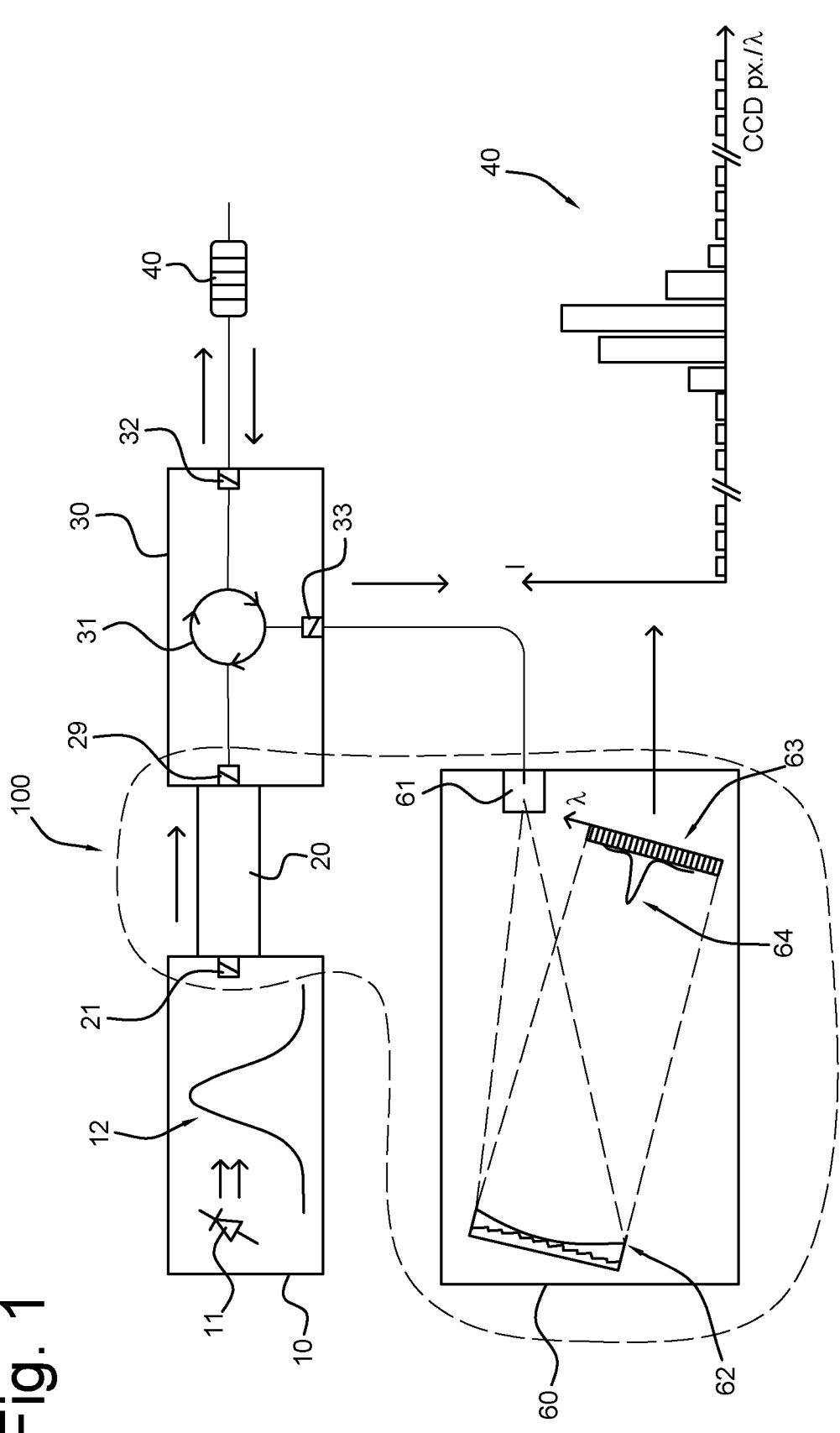
FIG. 1 depicts a schematic diagram of a system comprising a depolarizer circuit according to the present invention.

The following descriptions depict only example embodiments and are not considered limiting in scope. Any reference herein to the disclosure is not intended to restrict or limit the disclosure to exact features of any one or more of the exemplary embodiments disclosed in the present specification.

Furthermore, the terms first, second, third and the like in the description and in the claims are used for distinguishing between similar elements and not necessarily for describing a sequential or chronological order. The terms are interchangeable under appropriate circumstances and the embodiments of the invention can operate in other sequences than described or illustrated herein.

Moreover, the terms top, bottom, over, under and the like in the description and the claims are used for descriptive purposes and not necessarily for describing relative positions. The terms so used are interchangeable under appropriate circumstances and the embodiments of the invention described herein can operate in other orientations than described or illustrated herein.

Furthermore, the various embodiments, although referred to as "preferred" are to be construed as exemplary manners in which the invention may be implemented rather than as limiting the scope of the invention.

The term "comprising", used in the claims, should not be interpreted as being restricted to the elements or steps listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising A and B" should not be limited to devices consisting only of components A and B, rather with respect to the present invention, the only enumerated components of the device are A and B, and further the claim should be interpreted as including equivalents of those components.

It is noted that the term "arms" (e.g., a first and a second arm) is used herein, and may refer to waveguide branches in a depolarization circuit.

Embodiments of a depolarizer circuit are described herein.

In embodiments, at least one, preferably both, of the first and second delay line provides a phase delay being greater than the coherence of the light source.

In embodiments, one of the first and second delay lines provides a first phase delay at least twice a second phase delay provided by the other one of the first and second delay lines.

In embodiments, the phase delay difference relates to a difference in length and/or waveguide cross-sectional dimension and/or waveguide material.

In embodiments, the depolarizer circuit is an integrated optical depolarizer circuit.

In embodiments, the coupler comprises a switch configured to switch light to a plurality of outputs of the depolarizer circuit.

In embodiments, at least one of the first and second delay lines is replaced with an active phase modulator.

In embodiments, the depolarizer circuit further comprises: a further input waveguide configured to receive light; and a spectrometer configured to separate wavelengths of the received light.

In embodiments, the depolarizer circuit further comprises: a further splitter connected to the further input waveguide and configured to provide, at a first output of the third splitter, light in a first polarization state and, at a second output of the further splitter, light in a second polarization state; a third rotator connected to the first output of the further splitter and configured to rotate light received therefrom from the first polarization state to the second polarization state; a third delay line connected to the second output of the further splitter; and a coupler connected to the third rotator and the third delay line and configured to couple light received from each thereof and to provide the coupled light to the spectrometer.

In embodiments, at least one, preferably both, of the second and third delay lines provides a phase delay being greater than the coherence of the light source.

In embodiments, the second and third delay lines provide a further phase delay difference there between being at least twice a phase delay provided by the other of the second and third delay lines.

In embodiments, the depolarizer circuit further comprises: an input interface configured to couple the light source with the input waveguide; and an output interface configured to couple the output waveguide with the output of the depolarizer circuit.

Embodiments of a depolarizer circuit are described with reference to FIGS. 1-4B. The depolarization circuit may relate to any photonic circuit, such as an integrated photonic circuit (PIC) or an integrated depolarizer circuit, configured to at least partially depolarize light.

A first embodiment of a depolarization circuit 100 according to the present invention will be described with reference to FIG. 1. FIG. 1 shows a depolarizer circuit 100 comprising a first part 20 having an input interface 21 and an output interface 29. The depolarizer circuit 100 may comprise a second part 60 having a further input interface 61.

In FIG. 1, the first part 20 of the depolarizer circuit 100 is configured to receive light, e.g. light having an arbitrary state of polarization (SOP), through the input interface 21 and provide depolarized light to an output of the depolarizer circuit. In this embodiment, the second part 60 relates to a spectrometer having a dispersing element 62 and a detector 63. The detector 63 may be a Charge-Coupled Device (CCD) detector, e.g., an array detector in a Raman spectrometer. The dispersing element 62 may be a diffraction grating, Echelle grating, planar concave grating, arrayed waveguide grating (AWG), etc.

FIG. 1 further shows a system comprising the depolarizer circuit 100. The system comprises a reflector 40 configured to receive the depolarized light from the first part 20 of the depolarizer circuit 100 and reflect it back to the depolarizer circuit 100, preferably, to the second part 60 of the depolarizer circuit 100. The reflector 40 may be a distributed Bragg reflector, e.g. a Fiber Bragg Grating (FBG), configured to reflect particular wavelengths of light, while the other wavelengths of light are transmitted. The reflector 40 may be used as a sensor, e.g. sensitive to temperature. The system may be a measurement or data acquisition system, such as an optical interrogator, which is an optoelectronic instrument comprising an optical FBG sensor.

An example of a spectrometer-based FBG interrogator can be shown in FIG. 1, where the reflector 40 is an FBG illuminated by depolarized light, and where the second part 60 of the depolarizer circuit 100 is a spectrometer receiving a narrow wavelength band around a Bragg wavelength reflected and guided via an optical circulator 31 to the spectrometer. The spectrometer receives the reflected light through the further input interface 61, which may be an (input or output) aperture waveguide Alternatively, the further input interface 61 may be an entrance slit and/or collimator. The spectrometer may be an AWG spectrometer, such as the AWG in document WO2016005418A1, In this example, the AWG spectrometer comprises the dispersing element 62 which is an AWG and may be used for wavelength division multiplexing. Alternatively, the spectrometer is a diffraction grating spectrometer, and the dispersing element 62 in the spectrometer is a diffraction grating which images the sensor spectrum linearly onto the detector 63 being a CCD line array. The spectrometer may be configured to provide a spectral output 40, e.g., values of intensity as a function of CCD pixels per wavelength.

The system may comprise a circulator unit 30 having the optical circulator 31 configured for guiding from the output interface 29 of the first part 20 of the depolarizer circuit 100 (i.e., via a first port of the optical circulator 31) to the reflector 40 through an input-output interface 32 of the circulator unit 30 (i.e., via a second port of the optical circulator 31). Furthermore, the optical circulator 31 is configured to guide light reflected by the reflector 40 back through the input-output interface 32 of the circulator unit 30 (i.e., via a second port of the optical circulator 31) to the second part 60 of the depolarizer circuit 100 through an output interface 33 of the circulator unit 30 (i.e., via a third port of the optical circulator 31). The second part 60 of the depolarizer circuit 100 may receive the reflected light through the further input interface 61.

In embodiments, the depolarizer circuit 100 comprises a light source 10. In alternative embodiments, the system comprises the light source 10. The light source 10 may comprise a light emitting device 11, e.g., a light emitting diode (LED), super-luminescent diode (SLED or SLD), diode-pumped solid-state (DPSS) laser, laser diode (LD), micro LED (mLED), etc., emitting light 12, preferably at known wavelengths. The emitted light 12, preferably broadband light, may have an arbitrary or an unknown SOP. The light source 10 may have coherence properties, such as temporal coherence (e.g., coherence time and/or coherence length) and spatial coherence.

It is noted that the light source 10 described above with reference to FIG. 1 may be equivalent to the light source 10 in FIGS. 2-4B.

A second embodiment of a depolarizer circuit 200 according to the present invention will be described with reference to FIG. 2. The depolarizer circuit 200 comprises an input waveguide configured to receive light from a light source 10; a splitter 220 connected to the input waveguide and configured to provide, at a first output of the splitter 220, light in a first polarization state and, at a second output of the splitter, light in a second polarization state; a first rotator 230 connected to the first output of the splitter 220 and configured to rotate light received therefrom from the first polarization state to the second polarization state; a first delay line 240 connected to the second output of the splitter 220; a coupler 250 comprising a first and second output and configured to couple the light received from the first rotator 230 and the first delay line 240; a second rotator 260 connected to the first output of the coupler 250 and configured to rotate light received therefrom back to the first polarization state; a second delay line 270 connected to the second output of the coupler; and a combiner 280 connected to the second rotator 260 and the second delay line 270 and configured to combine light received from each thereof as at least partially depolarized light, preferably fully depolarized light.

The depolarizer may comprise an input interface 210 and an output interface 290. The input interface 210 is configured to couple the light source 10 with an input waveguide. Furthermore, the output interface 290 is configured to couple the output waveguide with an output of the depolarizer circuit 200.

The input interface 21, the output interface 29 and/or the further input interface 61 may be, for example, edge coupler structures, such as fiber-chip edge couplers configured to couple light between planar waveguide circuits and optical fibers.

The input waveguide is configured to receive light from the light source 10. The light provided to the depolarizer circuit 200 may contain at least one of a transverse electric (TE) component and a transverse magnetic (TM) component. For example, the light may be provided in a superposition or a mix of two polarization states TE+TM. The amount of TE light as compared to TM light may vary in time, and is not necessarily split 50/50.

The light may be decomposed, e.g. by the input interface 21, into a TE and TM component in the input waveguide, where the ratio and phase depend on the SOP of the light incoming from the light source 10 and/or the input interface 210 and/or the input waveguide.

The splitter 220 may be a polarization splitter. As shown in FIG. 2, the input waveguide is provided between input interface 210 and splitter 220. The splitter is connected to the input waveguide and is configured to provide, at a first output of the splitter 220, light in a first polarization state, in this example, TM light. The splitter is further configured to provide, at a second output of the splitter 220, light in a second polarization state, in this example, TE light.

The first rotator 230 may be a polarization rotator. As shown in FIG. 2, a waveguide is provided between first output of the splitter 220 and the first rotator 230. The first rotator 230 is connected to the first output of the splitter 220 and configured to rotate light received therefrom from the first polarization state to the second polarization state, in this example, rotating TM light to TE light.

Figure 2:
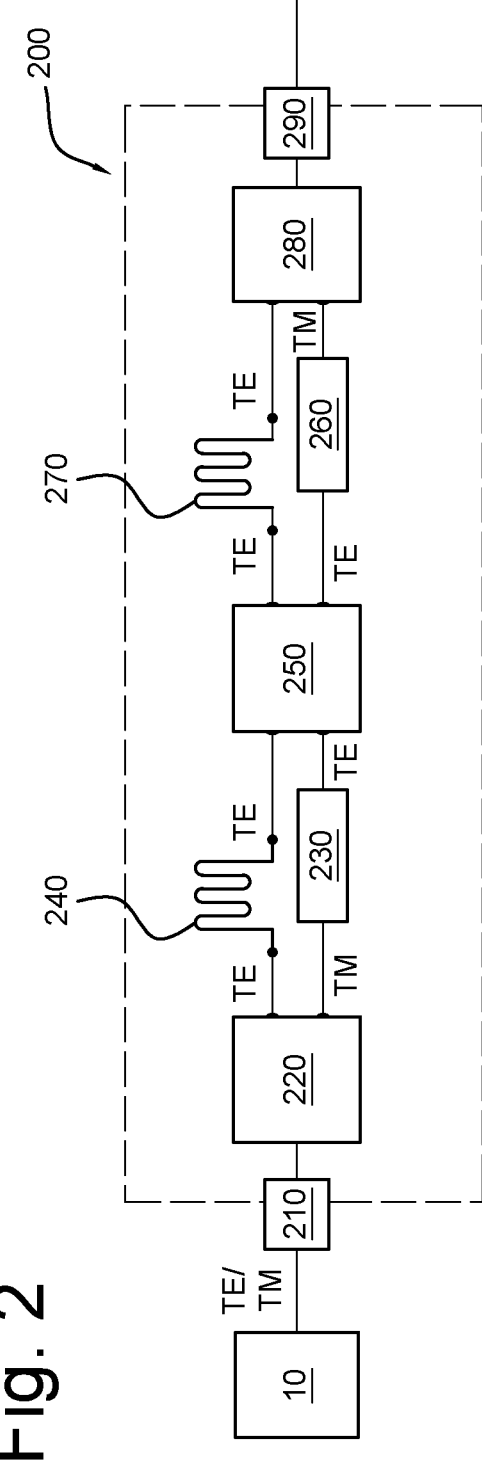
FIG. 2 depicts a schematic diagram of a depolarizer circuit according to the present invention.

As shown in FIG. 2, a waveguide is provided between the second output of the splitter 220 and the first delay line 240. The first delay line 240 is connected to the second output of the splitter 220 and configured to delay light received therefrom, in this example, TE light.

Furthermore, a first waveguide may be provided between an output of the first rotator 230 and a first input of the coupler 250 and a second waveguide is provided between an output of the first delay line 240 and a second input of the coupler 250. The coupler 250 is configured to receive, at a first input of the coupler 250, said rotated light from the first rotator 230, in this example, TE light. The coupler 250 is configured to receive, at a second input of the coupler 250, said delayed light from the first delay line 240, in this example, TE light. The coupler 250 is configured to couple the light received from the first rotator 230 and the first delay line 240 (i.e., said rotated light and said delayed light, respectively) and provide, at a first output and a second output of the coupler 250, said coupled light.

In FIG. 2, the coupler 250 is a directional coupler, particularly a 2×2 coupler, where light is combined at the first and second inputs of the 2×2 coupler and split at the first and second outputs of the 2×2 coupler, according to a coupling ratio, e.g. 10/90, 20/80, 30/70, 40/60, 50/50, 60/40, 70/30, 80/20, 90/10, or any other coupling ratio with values between the afore-mentioned values.

The second rotator 260 may be a polarization rotator. As shown in FIG. 2, a waveguide may be provided between the first output of the coupler 250 and the second rotator 260. The second rotator 260 is connected to the first output of the coupler 250 and configured to rotate light received therefrom back to the first polarization state, in this example, rotating from TE light back to TM light.

As shown in FIG. 2, a waveguide is provided between the second output of the coupler 250 and the second delay line 270. The second delay line 270 is connected to the second output of the coupler 250 and configured to delay light received therefrom, in this example, TE light.

The combiner 280 may be a polarization combiner. In FIG. 2, the combiner 280 is connected to the second rotator 260 and the second delay line 270 and configured to combine light received from each thereof as at least partially depolarized light. For example, polarization of light is reduced or dropped by 40% or more, 50% or more, 60% or more, 70% or more, 80% or more or 90% or more. It will be understood that the polarization of light may be reduced or dropped by a percentage value in a range between any two of the above mentioned percentages (e.g., 40-50%, 40-60%, . . . , 40-90%, 50-60%, 50-70%, . . . , 70-90%, 80-90%, etc.). Preferably, the combiner 280 is connected to the second rotator 260 and the second delay line 270 and configured to combine light received from each thereof as fully depolarized light.

Light from both waveguides branches (i.e., arms for the second rotator and/or delay line 260, 270) may be superimposed through the combiner 280. As this is done incoherently, there may be no distinct SOP and the output light can be considered to be depolarized.

As shown in FIG. 2, the depolarizer circuit 200 may comprise an output waveguide configured to provide the at least partially depolarized light, preferably fully depolarized light, to an output of the depolarizer circuit 200, e.g. through the output interface 290.

The depolarizer circuit 200 may comprise a waveguide connecting an output of the combiner 280 to another component of the depolarizer circuit 200, not necessarily to the output of the depolarizer circuit 200.

Either or both of the first and second rotators 230, 260 may be provided as a rib waveguide, the rib waveguide preferably including: a slab portion; and a ridge portion, which is disposed along a surface of the slab portion, wherein the slab portion has a first slab region whose width, as measured in a direction perpendicular to a guiding direction of the waveguide, increases from a first slab width to a second slab width along a first length, and wherein the ridge portion has a first ridge region whose width, as measured in the same direction as the slab widths, decreases from a first ridge width to a second ridge width along the same first length, such that the rotator is configured to rotate the polarization of light during its transmission through the rib waveguide.

Either or both of the first and second rotators 230, 260 may rotate light on a first waveguide branch (i.e., first arm), e.g., with respect to light on a second waveguide branch (i.e., second arm), by 15 degrees or more, 30 degrees or more, 45 degrees or more, 60 degrees or more, 75 degrees or more, 90 degrees or more, 105 degrees or more, 120 degrees or more, 135 degrees or more . . . 180 degrees or more, etc.

Either or both of the first and second delay lines 240, 270 may be provided as a waveguide having delaying properties relating to, respectively, a first and second length, a first and a second set of cross-sectional dimensions (e.g., width, height, radius, diameter, circumference, etc.), and a first and second material. Either or both of the first and second delay lines 240, 270 may provide a phase delay based on a delaying property of the respective delay line 240, 270. It will be understood that a delaying property of a delay line relates to the delay line at a second arm of the depolarizer circuit 200 (e.g. between the second output of the splitter 220 and the second input of the coupler 250, and/or between the second output of the coupler 250 and the second input of the combiner 280) having at least one of a length, cross-sectional dimension, and material being different than the respective at least one of a length, cross-sectional dimension, and material of a first arm of the depolarizer circuit 200 (e.g. between the first output of the splitter 220 and the first input of the coupler 250, and/or between the first output of the coupler 250 and the first input of the combiner 280).

Therefore, a phase delay may relate to a difference in length and/or waveguide cross-sectional dimension and/or waveguide material between the first and second arms. For example, the length of the first delay line 240 on the second arm (e.g., between the second output of the splitter 220 and the second input arm of the coupler 250) is greater than the length of the first arm or of the rotator 230 thereon (e.g., between the first output of the splitter 220 and the first input arm of the coupler 250). In another example, a first circular waveguide having a larger diameter and/or a material with a higher refractive index (RI) than a second circular waveguide, would result in a higher phase delay at the first circular waveguide with respect to the second circular waveguide.

One of the first and second delay lines 240, 270 may provide a first phase delay at least twice a second phase delay provided by the other one of the first and second delay lines, otherwise, interference can occur. For example, the first delay line 240 may have a first length two times a second length of the second delay line 270. A length ratio of first length to second length may be, but not limited to: 1:2, 2:1, 1:3, 3:1, 1:4, 4:1, 1:5, 5:1, 2:4, 4:2, 2:5, 5:2, 2:6, 6:2, etc. Other examples can be understood by the skilled person, such as, the first delay line 240 may have a first material with a first RI half of a second RI of a second material of the second delay line 270. A phase delay ratio between the first and second lines 240, 270 may also be any of the aforementioned length ratios, but not limited thereto.

At least one of the first and second delay lines 240, 270 may provide a phase delay being greater than the coherence of the light source 10, particularly, at least one coherence property of the light source 10. For example, the first delay line 240 has a length greater than the coherence length of the light source 10 and/or the first delay line 240 provides a phase delay greater than the coherence time of the light source 10.

The phase delay difference may relate to a difference in length and/or waveguide cross-sectional dimension and/or waveguide material, as described above.

The first and second delay lines 240, 270 may provide a phase delay difference there between being greater than or equal to a coherence of the light source 10, particularly, at least one coherence property of the light source 10. For example, the phase delay difference may be greater than or equal to a coherence time and/or a coherence length of the light source 10. As it will be understood, the phase delay difference may be a subtraction of the first phase delay with the second phase delay and vice versa, and/or a division of the first phase delay with the second phase delay and vice versa.

The first phase delay ensures that the light in both waveguide branches (i.e., arms for the first rotator and/or delay line 230, 240, as described above) becomes uncorrelated, such that said light can be incoherently coupled in the coupler 250 minimizing possible interference effects. It is important to note that without the coupler 250, input light, from the light source 10, with a linear SOP would otherwise only pass through one of the waveguides. The linear SOP would be maintained in that case. Additionally or alternatively, the second delay line 270 ensures that the light in both waveguide branches (i.e., arms for the second rotator and/or delay line 260, 270, as described above) becomes decorrelated, such that said light can be incoherently combined in the combiner 280 minimizing possible interference effects.

The first and second delay lines 240, 270 may be replaced with a first and second phase shifters. Preferably, the first and second delay lines 240, 270 may be passive components.

Alternatively, the first and second delay lines 240, 270 may be provided before or after the first and second rotators 230, 260, respectively. Here, a delay line and a rotator are connected to each other. For example, a first end of the first delay line 240 is connected to the first output of the splitter 220 and the other end of the first delay line 240 is connected to the first rotator 230, where the second output of the splitter 220 is directly connected to the second input of the coupler 250. Further in this example, a first end of the second delay line 270 is connected to the first output of the coupler 250 and the other end of the second delay line 260 is connected to the second rotator 270, where the second output of the coupler 250 is directly connected to the combiner 280. From the above example, the skilled person would understand how the first and second delay lines 240, 270 can be connected right after the first and second rotators 230, 260, respectively. More alternatively, the first and second rotators 230, 260 may include the first and second rotators 230, 260. Here, a rotator includes the delaying properties of a delay line. Even more alternatively, the first and second delay lines 240, 270 may include the first and second delay lines 240, 270.

The depolarizer circuit 200 may comprise an active phase modulator for modulating light received from an output of the combiner 280, e.g. at the output waveguide or at an output of the output interface 290. The active phase modulator may be an active phase and amplitude modulator configured to separate an input carrier into a plurality of phases. The phases may be amplified and modulated separately. Summing circuits in the active phase modulator may combine the phases into a single resultant output. The function of a modulator is to provide a signal exactly in amplitude but out of phase (e.g., 180 degrees) with an unwanted signal existing in the circuit. The result is that the unwanted signal is nulled out and cancelled. Unwanted signals may be, for example, signals from a nearby transmitter coupled into input circuits of a receiver, or distortion causing signals in transmitter circuits. The depolarizer circuit 200 may be said receiver and/or transmitter. Alternatively or additionally, the depolarizer circuit 200 may comprise an active phase modulator as a replacement of at least one of the first and second delay lines 240, 270. For example, a first active phase modulator may receive light from the splitter 220 and modulate the light according to a first modulation scheme (e.g., adding a first phase delay). A second active phase modulator may receive light from the coupler 250 and modulate the light according to a second modulation scheme (e.g., adding a second phase delay, which may be at least twice as the first phase delay).

The input interface 210 and the splitter 220 and/or the output interface 290 and the combiner 280 may be replaced with a two-dimensional (2D) grating coupler. The 2D grating coupler may allow one of the polarization states to be automatically rotated.

Figure 3:
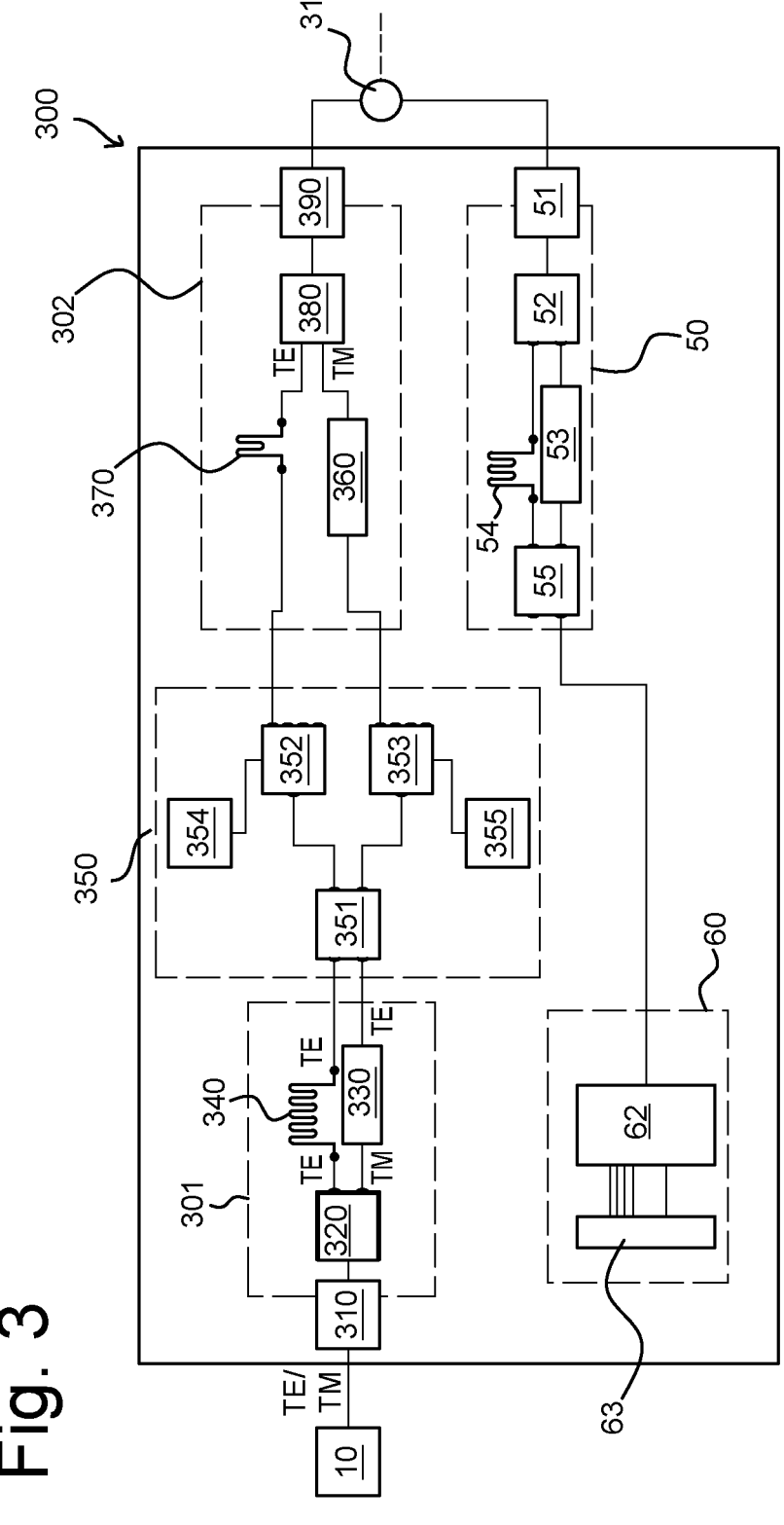
FIG. 3 depicts a schematic diagram of a system comprising a depolarizer circuit according to the present invention.

A third embodiment of a depolarization circuit 300 according to the present invention will be described with reference to FIG. 3. FIG. 3 shows a depolarizer circuit 300 comprising a first part 301, a second part 302 and a coupler 350 connecting the first and second parts 301, 302 to each other. The depolarizer circuit 100 may comprise a third part 50 having a further input interface 51.

Components 310, 320, 330, 340, 360, 370, 380, 390 of the first and second parts 301, 302 of the depolarizer circuit 300 in FIG. 3 correspond in many aspects and/or features to the components 210, 220, 230, 240, 260, 270, 280, 290 of the depolarizer circuit 200 in FIG. 2, respectively.

As shown in FIG. 3, the coupler 350 comprises a first and second inputs and a first and second outputs, which corresponds in many aspects and/or features to the coupler 250 of the second embodiment as shown in FIG. 2. In the third embodiment, the coupler 350 comprises one or more switches, preferably at least one switch, configured to switch light at a certain wavelength.

The coupler 350 may comprise a first switch 351 configured to switch said rotated and delayed light, received at the first and second inputs of the coupler 350, respectively, e.g. at a first wavelength. The coupler 350 may further comprise a second switch 352 configured to switch the switched light, received from a first output of the first switch 351, e.g. at a second wavelength and provide, at a first output of the coupler 350, light switched by the second switch 351. The coupler 350 may further comprise a third switch 353 configured to switch the switched light, received from a second output of the first switch 351, e.g. at a third wavelength and provide, at a second output of the coupler 350, light switched by the third switch 353. FIG. 3 shows the coupler 350 comprising three switches, particularly a 2×2 switch 351 and a first and second 1×4 switches 352, 353. The 2×2 switch 351 is connected, at a first and second inputs of the 2×2 switch 351, to the first and second inputs of the coupler 350, respectively, and, is thereby connected to the first rotator 330 and the first delay line 340, as described above. The 2×2 switch 351 is further connected, at a first and second outputs of the 2×2 switch 351, to an input of each of the first and second 1×4 switches 352, 353. The first and second 1×4 switches 352, 353 are connected, as a first and second output of the first and second 1×4 switches 352, 353, to the first and second outputs of the coupler 350, respectively, and, is thereby connected to the second rotator 360 and the second delay line 370, as described above. It will be understood that the second and third switches 352, 353 may be 1×2 switches or any other switches having one or more outputs. The first switch 351 may be replaced with a first coupler, e.g. a 2×2 coupler.

The second and third switches 352, 353 may be configured to switch light to different outputs of the second and third switches 352, 353 (i.e., the coupler 350), respectively to different outputs (e.g., optical fibers and/or output waveguides) of the depolarizer circuit 300. For example, the second and third switches 352, 353 are 1×4 switches that each have four outputs (eight in total) for outputting light to four outputs of the depolarizer circuit 300. In this example, the switched light may be output from four outputs of the second switch 352 to four second delay lines (e.g., similar to the second delay line 370) and from four outputs of the third switch 353 to four second rotators (e.g., similar to the second rotator 360), which are then delayed and rotated, respectively, and subsequently combined by four combiners (e.g., similar to the combiner 380) and output to four outputs of the depolarizer circuit 300 through four output interfaces (e.g., similar to the output interface 390) which may relate to four optical fibers.

The coupler 350 may further comprise at least one controller configured to control at least one of the one or more switches (e.g., one controller controlling multiple switches, one controller controlling one switch, etc.). For example, as shown in FIG. 3, the coupler 350 comprises a first and second controllers 354, 355 configured to control the first and second 1×4 switches 352, 353. For example, the first and second controllers 354, 355 may control the wavelength at which light is switched therein. In this example, the first and second 1×4 switches 352, 353 may switch light at a similar or different wavelength to each other, and/or a similar or different wavelength to the wavelength at which light is switched in the 2×2 switch 351, such as at a fraction of ½, ⅓, ¼, ⅕, ⅙, ⅐, ⅛, etc. or at a multiple of 2, 3, 4, 5, 6, 7, 8, etc. In another example, the first and second controllers 354, 355 may control the amount of TE light as compared to TM light, such as a balance of polarization 50/50.

FIG. 3 shows the depolarizer circuit 300 comprising the third part 50 having a further input interface 51 which corresponds in many aspects and/or features to the further input interface 61 of the second embodiment as shown in FIG. 2. The further input interface 51 is configured to receive light, preferably from an external component as shown in FIG. 3. Alternatively, the light is received from within the depolarizer circuit 300, e.g., from the combiner 380.

The third part 50 may comprise a further splitter 52 connected to the further input waveguide and configured to provide, at a first output of the further splitter 52, light in a first polarization state of the two polarization states and, at a second output of the further splitter 52, light in a second polarization state of the two polarization states. The third part 50 may further comprise a third rotator 53 connected to the first output of the further splitter 52 and configured to rotate light received therefrom from the first polarization
state to the second polarization state. The third part 50 may
further comprise a third delay line 54 connected to the
second output of the further splitter 52 and configured to
delay light received therefrom. The third part 50 may further
comprise a further coupler 55 connected to the third rotator
53 and the third delay line 54 and configured to couple light
received from each thereof and to provide the coupled light
to a measuring unit 60.

The further splitter 52, the third rotator 53 and the third
delay line may correspond in many aspects and/or features
to the splitter 320, the first and/or second rotator 330, 360,
and the first and/or second delay line 340, 370, respectively.

The further coupler 55 may be configured to receive, at a
first input of the further coupler 55, rotated light from the
third rotator 53, in this example, TE or TM light, preferably
TE light. The further coupler 55 is configured to receive, at
a second input of the further coupler 55, delayed light from
the third delay line 54, in this example, TE or TM light,
preferably TE light. The further coupler 55 is configured to
couple the light received from the third rotator 53 and the
third delay line 54 (i.e., said rotated light and said delayed
light, respectively) and provide, at one output of the further
coupler 55, said coupled light.

As shown in FIG. 3, the depolarizer circuit 300 may
comprise a third part 60 which receives light from the
second part 50, preferably the coupled light from the further
coupler 55. In this embodiment, the second and third parts
50, 60 are connected by a crossing and/or a waveguide. The
third part 60 may relate to a measuring unit, preferably, a
spectrometer having a dispersing element 62 and a detector
63, as described above in the first embodiment.

In the embodiment described above, where light is
switched to different outputs of the depolarizer circuit 300,
the depolarizer circuit 300 may further receive light (e.g.,
from an external component) at different inputs (e.g., optical
fibers and/or further input waveguides). For example, given
the second and third switches 352, 353 are 1×4 switches, and
the depolarizer circuit 300 may comprise four further input
interfaces (e.g. similar to the further input interface 51)
configured to receive light from an output (e.g., a third port)
of four optical circulators (e.g., similar to the optical circu-
lator 31). The four further input interfaces may provide the
received light to four further splitters (e.g., similar to the
splitter 52), which respectively splits the light to four third
delay lines (e.g., similar to the third delay line 54) and four
third rotators (e.g., similar to the third rotator 53), which are
then delayed and rotated, respectively, and subsequently
combined by four further couplers (e.g., similar to the
further coupler 55) and received by the third part 60 (e.g., via
four crossings and/or waveguides).

It will be understood that any of the switches described
herein may have one or more, preferably, a plurality of
outputs or output channels, such as 2 or more, 3 or more, 4
or more, 5 or more, 6 or more, 7 or more, 8 or more, 9 or
more, 10 or more, etc. In embodiments, a number of the
output channels may be related to a number of outputs of the
depolarizer circuit 300 or a number of fibers connected to the
output(s) of the depolarizer circuit 300.

At least one, preferably all, of the first, second and third
delay lines 340, 370, 54 may provide a phase delay being
greater than the coherence of the light source 10, as
described above with reference to the first and second delay
lines 240, 270.

Any two of the first, second and third delay lines 340, 370,
54 may provide a further phase delay difference there
between being at least twice a phase delay provided by the other of the two of the first, second and third delay lines 340,
370, 54. For example, a phase delay difference between the
first and second delay lines 340, 370, the first and third delay
lines 340, 54 or the second and third delay lines 370, 54. For
example, the first delay line 340 may have a first length four
times a second length of the second delay line 370 and two
time a third length of the third delay line 54. A length ratio
of first length to second length to third length, but not limited
thereto: 1:2:4, 1:4:2, 2:1:4, 2:4:1, 4:1:2, 4:2:1, 1:3:9, . . .
9:3:1, . . . , 1:2:9, . . . , 9:2:1, etc. Other examples can be
understood by the skilled person, such as, the first delay line
340 may have a first material having a first RI one-fourth a
second RI of a second material of the second delay line 370
and half a third RI of a third material of the third delay line
54. A phase delay ratio among the first, second and third
lines 340, 370, 54 may also be any of the afore-mentioned
length ratios, but not limited thereto.

The third delay line 54 may correspond in many aspects
and/or features to the first and/or second delay lines 240,
270, 340, 370 as described above. For example, the third
delay line 54 may comprise any one or more of the delaying
properties described above with reference to the first and
second delay lines 240, 270.

The third rotator 53 may correspond in many aspects
and/or features to the first and/or second rotators 230, 260,
330, 360 as described above.

It will be understood that the depolarizer circuit 300 may
comprise one or more second parts 302 and/or one or more
third parts 50. For example, a number of the one or more
second parts 302 and/or the one or more third parts 50 may
relate to a number outputs of the second and third switches
352, 353.

Figures 4A, 4B:
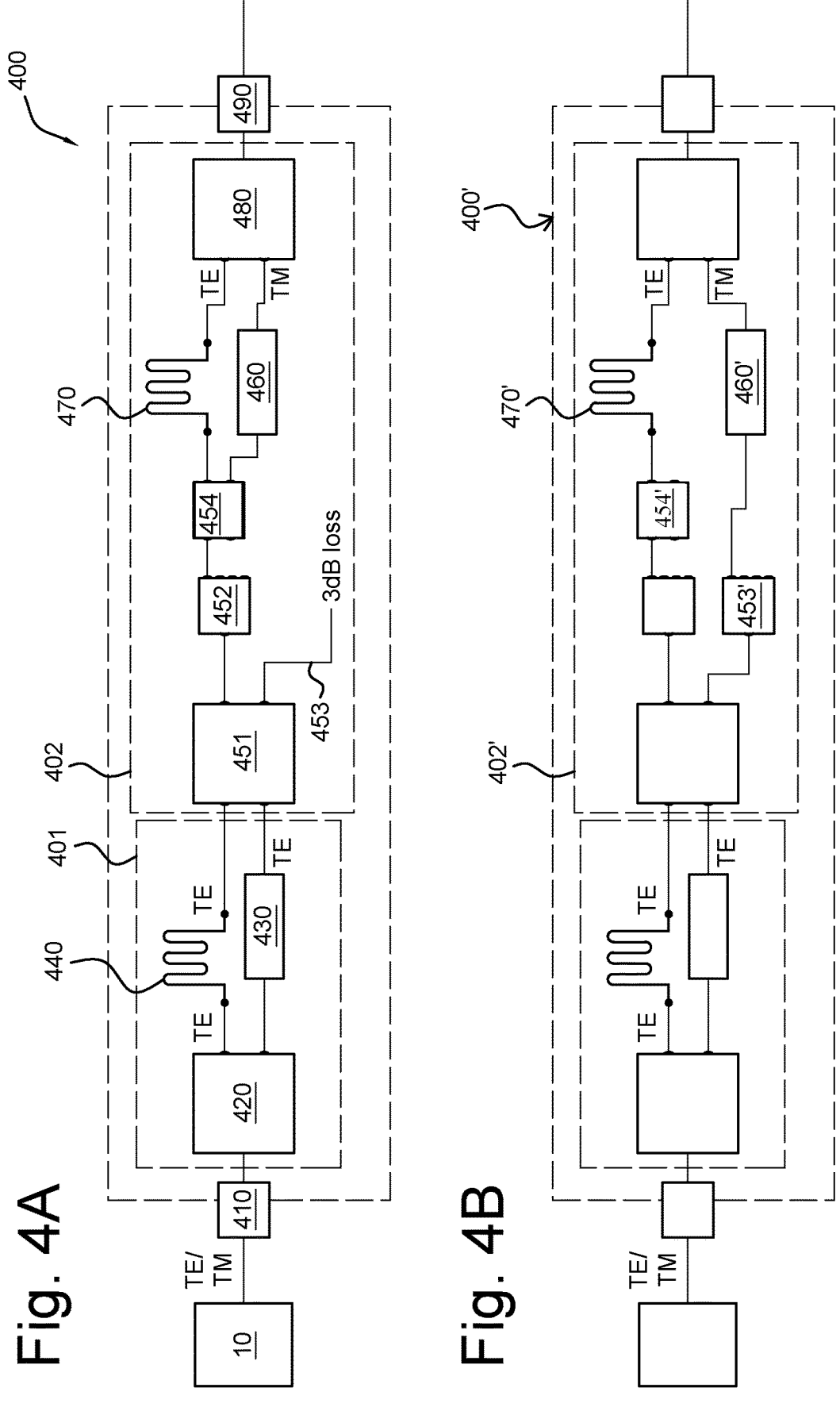
FIGS. 4A and 4B depict schematic diagrams of depolarizer circuits according to the present invention.

A fourth embodiment of a depolarization circuit 400
according to the present invention will be described with
reference to FIG. 4A. FIG. 4A shows a depolarizer circuit
400 comprising a first part 401 and a second part 402.

Components 410, 420, 430, 440, 460, 470, 480, 490 of the
first and second parts 401, 402 of the depolarizer circuit 400
in FIG. 4A respectively correspond in many aspects and/or
features to the components 210, 220, 230, 240, 260, 270,
280, 290 of the depolarizer circuit 200 in FIG. 2 and/or the
components 310, 320, 330, 340, 360, 370, 380, 390 of the
depolarizer circuit 300 in FIG. 3.

A shown in FIG. 4A, coupling of the rotated and delayed
light from the first rotator and delay line 430, 440 is
performed in the second part 402. However, this embodi-
ment is not limited to the coupling being performed in
between the first and second parts 401, 402 as described in
the second and third embodiments.

The depolarizer circuit 400 may comprise: a first coupler
451 configured to couple said rotated and delayed light
received at a first and second inputs of the first coupler 451,
respectively. The first coupler 451 provides, at a first and
second outputs of the first coupler 451, the light coupled by
the first coupler 451. The depolarizer circuit 400 may further
comprise: a switch 452 configured to switch the coupled
light, received from the second output of the first coupler
451, e.g. at a specific wavelength and provide the switched
light at an output of the switch 452; and a second coupler
450 configured to receive, at an input of the second coupler
454, the switched light and couple said switched light. The
second coupler 454 is configured to provide, at a first output
and second output of the second coupler 450, the light
coupled by the second coupler 450. In this embodiment, the
light coupled by the first coupler 451 and provided at the first
output of the first coupler 451 is considered to be lost signal
power 453.

In this embodiment, the second rotator 460 and the second delay line 470 receive the light (In FIG. 4A being TE light) coupled by the second coupler 454, at the first and second outputs of the second coupler 454, respectively. In the example of FIG. 4A, the second rotator 460 rotates the TE light to TM light, such that that combiner 480 combines the TE and TM light received from the second delay line 470 and the second rotator 480, respectively. As will be understood, other polarization states may be provided to the components of the depolarizer circuit 400 (e.g., TM light to the first delay line 440 and TE light to the first rotator 430, TM light to both the second rotator and delay line 460, 470 etc.).

FIG. 4A shows the first coupler 451 as a first 2×2 coupler, where the coupled light provided at the first output of the first coupler 451 is a 3 dB loss 453. Other values of power loss may be at most any one of 1 dB, 2 dB, 3 dB, 4 dB, 5 dB, 6 dB, 7 dB, 8 dB, etc. It will be understood that other values of power loss may be included in ranges of any two of the afore-mentioned values (e.g., 1-2 dB, 1-3 dB, . . . , 2-3 dB, 2-4 dB, . . . , 7-8 dB, 7-9 dB, etc.).

FIG. 4A shows the switch 452 as a 1×4 switch receiving the coupled light form the second output of the first 2×2 coupler, and providing at a first output of the 1×4 switch, switch light to a first input of the second coupler 454 being a second 2×2 coupler.

A further embodiment of a depolarization circuit 400' according to the present invention will be described with reference to FIG. 4B. FIG. 4B shows a depolarizer circuit 400' comprising a second part 402' correspond in many aspects and/or features to the depolarizer circuit 400 and the second part 402 of the fourth embodiment of FIG. 4A, therefore, only the differences will be described here for the sake of brevity.

In this embodiment, the light coupled by the first coupler 451 is provided at the first output of the first coupler 451 to a second switch 453'. A first switch 452 is configured to switch the coupled light, received from a first output of the first coupler 451, at a first wavelength and provide, at a first output of the first switch 452, light switched by the first switch 452 to a second coupler 454', as described in the fourth embodiment. The second switch 453' is configured to switch the coupled light, received from the second output of the first coupler 451, at a second wavelength and provide, at a first output of the second switch 453', light switched by the second switch 453' to the second rotator 460'. Furthermore, the second coupler 454' provides, at the second output of the second coupler 454', light coupled by the second coupler 454' to a second delay line 470'. Here, coupled light is not provided at the first output of the second coupler 454', as shown in FIG. 4B.

FIG. 4B shows the second switch 453' as a second 1×4 switch. The first and/or second switches 452, 453' may correspond in many aspects and/or features to the switches described in the third embodiment of FIG. 3, e.g. the first and second wavelengths of the switches 452, 453' may be different or similar and/or the first and second switches may be controlled by at least one of a first and a second controller, respectively, etc. For example, the first and/or second switches 452, 453' may output switched light to one or more outputs of the depolarizer circuit 400, 400'.

As will be understood, the system described with reference to FIG. 1 may comprise any one or combination of aspects and/or features of the depolarizer circuits 200, 300, 400, 400' of the second, third, fourth and further embodiments, respectively, described with reference to FIGS. 2-4B.

For example, the system may comprise the depolarizer circuit 300 and one or more optical circulators 31.

The depolarizer circuit 100, 200, 300, 400, 400' as described herein may be used in an optical interrogator and/or an optical gyroscope.

An optical interrogator may be an optoelectronic instrument, which allows the reading of optical Fiber Bragg Grating (FBG) sensors in static and/or dynamic monitoring applications. An optical gyroscope may be a fiber optic gyroscope (FOG), preferably an interferometric FOG, a resonant FOG (RFOG), a Stimulated Brillouin scattering FOG, etc.

The depolarizer circuit 100, 200, 300, 400, 400' may be used with a FBG sensor. FBG sensors are designed to reflect a specific wavelength based on temperature or strain. Due to imperfections in the fiber, the reflected wavelength from the FBG can be slightly different for TE or TM polarized light. Therefore, it can be important to couple in non-polarized light into the fiber, such that there is no polarization dependent wavelength shift.

The depolarizer circuit 100, 200, 300, 400, 400' may be used in (de)multiplexer applications, such as where a sharp separation of an input spectrum is desired.

The depolarizer circuit 100, 200, 300, 400, 400' may be used with or in a FOG sensor FOG in astronautics, including spacecraft, satellite, aircraft, etc., and/or in civil fields such as ship, automobile navigation, mine, and so on.

In embodiments, the use of the depolarizer circuit 100, 200, 300, 400, 400' relates to structural health monitoring. For example, bridges, dams, tunnels as well as buildings can be equipped with fiber optic sensors for continuous structural health monitoring. Fiber sensors mounted in or onto concrete or steel structures may be used to predict and detect small defects early on. Preventive maintenance can then be performed to avoid structural damage to the infrastructure.

In embodiments, the use of the depolarizer circuit 100, 200, 300, 400, 400' relates to bearing condition monitoring. Bearings may be equipped with fiber optic sensors to bring the benefits of fiber optic sensing to ships, trains, trucks and heavy construction equipment. Continuous load sensing improves the efficiency of rotating equipment, while lifetime prediction and early failure detection prevent damage to the bearing and more importantly to expensive surrounding parts like gearboxes and engines.

In embodiments, the use of the depolarizer circuit 100, 200, 300, 400, 400' relates to wind turbines. Fiber optic sensors may be installed on blades, bearings, gearbox, tower and jacket of wind turbines to predict, detect and prevent failures before they lead to costly repairs. Equally important fiber optic sensors embedded in the blades may be used to monitor and increase the efficiency of the turbine.

A method of depolarizing light in a depolarizer circuit, preferably, the depolarizer circuit 100, 200, 300, 400, 400' described above, comprises: receiving light, by an input waveguide, from a light source 10; splitting, by a splitter 220, 320, 420, the light into a first portion having a first polarization state and a second portion having a second polarization state; rotating, by a first rotator 230, 330, 430, the polarization of the first portion, such that it has the second polarization state; delaying, by a first delay line 240, 340, 440, the second portion; coupling, by a coupler 250, 350, 451, the first portion and second portion into a third portion and a fourth portion; rotating, by a second rotator 260, 360, 460, 460', the polarization of the third portion back to the first polarization state; delaying, by a second delay line 270, 370, 470, 470', the fourth portion; and combining, by a combiner 280, 380, 480, the third portion and the fourth portion as depolarized light.

Embodiments of methods will be understood from the aspects and/or features of the depolarizer circuit 100, 200, 300, 400, 400' described above.

Although the present invention has been described above with reference to certain embodiments thereof, it will be evident that various modifications and changes may be made to these embodiments without departing from the broader scope of the present invention, as defined by the appended claims.

The invention claimed is:

1. A depolarizer circuit, comprising:
an input waveguide configured to receive light;
a splitter connected to the input waveguide and configured to provide, at a first output of the splitter, light in a first polarization state and, at a second output of the splitter, light in a second polarization state;
a first rotator connected to the first output of the splitter and configured to rotate light received therefrom from the first polarization state to the second polarization state;
a first delay line connected to the second output of the splitter;
a coupler comprising a first and second output and configured to couple the light received from the first rotator and the first delay line;
a second rotator connected to the first output of the coupler and configured to rotate light received therefrom back to the first polarization state;
a second delay line connected to the second output of the coupler; and
a combiner connected to the second rotator and the second delay line and configured to combine light received from each thereof as depolarized light,
wherein the first and second delay lines provide a phase delay difference there between being greater than or equal to a coherence of the light received by the input waveguide.

2. The depolarizer circuit according to claim 1, wherein at least one of the first and second delay line provides a phase delay being greater than the coherence of the light received by the input waveguide.

3. The depolarizer circuit according to claim 1, wherein one of the first and second delay lines provides a first phase delay at least twice a second phase delay provided by the other one of the first and second delay lines.

4. The depolarizer circuit according to claim 1, wherein the phase delay difference relates to a difference in one or more of: length, waveguide cross-sectional dimension, and waveguide material.

5. The depolarizer circuit according to claim 1, wherein the depolarizer circuit is an integrated optical depolarizer circuit.

6. The depolarizer circuit according to claim 1, wherein the coupler comprises a switch configured to switch light to a plurality of outputs of the depolarizer circuit.

7. The depolarizer circuit according to claim 1, further comprising an active phase modulator configured to modulate combined light.

8. The depolarizer circuit according to claim 1, further comprising:

a further input waveguide configured to receive light; and
a spectrometer configured to separate wavelengths of received light.

9. The depolarizer circuit according to claim 8, further comprising:
a further splitter connected to the further input waveguide and configured to provide, at a first output of the third splitter, light in a first polarization state and, at a second output of the further splitter, light in a second polarization state;
a third rotator connected to the first output of the further splitter and configured to rotate light received therefrom from the first polarization state to the second polarization state;
a third delay line connected to the second output of the further splitter; and
a coupler connected to the third rotator and the third delay line and configured to couple light received from each thereof and to provide the coupled light to the spectrometer.

10. The depolarizer circuit according to claim 9, wherein at least one of the second and third delay lines provides a phase delay being greater than the coherence of the light received by the input waveguide.

11. The depolarizer circuit according to claim 9, wherein the second and third delay lines provide a further phase delay difference there between being at least twice a phase delay provided by the other of the second and third delay lines.

12. The depolarizer circuit according to claim 1, further comprising:
an input interface configured to couple the light source with the input waveguide; and
an output interface configured to couple the output waveguide with the output of the depolarizer circuit.

13. A system comprising a reflector and the depolarizer circuit of claim 1, wherein the reflector is configured to receive depolarized light from an output of the depolarizer and to reflect light to an input of the depolarizer circuit.

14. The system of claim 13, wherein the system is an optical interrogator.

15. A method of depolarizing light in the depolarizer circuit of claim 1, comprising the steps of:
receiving light, by the input waveguide;
splitting, by the splitter, the light into a first portion having the first polarization state and a second portion having the second polarization state;
rotating, by the first rotator, the polarization of the first portion, such that it has the second polarization state;
delaying, by the first delay line, the second portion;
coupling, by the coupler, the first portion and second portion into a third portion and a fourth portion;
rotating, by the second rotator, the polarization of the third portion back to the first polarization state;
delaying, by the second delay line, the fourth portion; and
combining, by the combiner, the third portion and the fourth portion as depolarized light,
wherein the method further comprises providing a phase delay difference between the first and second delay lines, the phase delay difference being greater than or equal to a coherence of the light received by the input waveguide.

* * * * *